United States Patent
Ogawa et al.

[11] Patent Number: 5,981,056
[45] Date of Patent: Nov. 9, 1999

[54] CHEMICALLY ADSORBED FILM

[75] Inventors: Kazufumi Ogawa, Hirakata; Norihisa Mino, Settu; Mamoru Soga, Osaka, all of Japan

[73] Assignee: Matsushita Electric Industrial Co., Japan

[21] Appl. No.: 07/872,185

[22] Filed: Apr. 22, 1992

[30] Foreign Application Priority Data

Apr. 30, 1991 [JP] Japan .................................. 3-098916
Jun. 14, 1991 [JP] Japan .................................. 3-143497

[51] Int. Cl.$^6$ ...................................................... B32B 7/00
[52] U.S. Cl. .......................... 428/333; 428/429; 428/447; 428/450
[58] Field of Search ..................... 428/333, 429, 428/447, 450

[56] References Cited

U.S. PATENT DOCUMENTS

| | | | |
|---|---|---|---|
| 4,199,649 | 4/1980 | Yundt | 428/426 X |
| 4,824,766 | 4/1989 | Ogawa | 430/299 |
| 4,992,300 | 2/1991 | Ogawa et al. | 427/44 |

FOREIGN PATENT DOCUMENTS

| | | |
|---|---|---|
| A-0282188 | 9/1988 | European Pat. Off. . |
| 0363924 | 4/1990 | European Pat. Off. . |
| A-0474228 | 3/1992 | European Pat. Off. . |
| A-0484746 | 5/1992 | European Pat. Off. . |

*Primary Examiner*—D. S. Nakarani
*Attorney, Agent, or Firm*—Morrison & Foerster, LLP

[57] ABSTRACT

According to the invention, a fluorine-based or siloxane-based chemical adsorbed film containing a fluorocarbon compound can be formed on a given substrate surface in a laminated state and through chemical bonds (i.e., covalent bonds) with the substrate, it is possible to obtain a laminated film which has satisfactory adhesion to the substrate, is substantially pin-hole free and is very thin. Further, since the outermost layer may be substituted by fluorocarbon groups or hydroxyl groups, it is possible to obtain a film which has excellent water- and oil-repelling properties or hydrophilic and oil-repelling properties and can replace fluorine-based coating films, thus improving the performance of products requiring a coating having a water- and oil-repelling resistant property, weather-resistant property, wear-resistant property and so forth which are desirable in electric products, vehicles, industrial devices and so forth.

3 Claims, 12 Drawing Sheets

CHEMICALLY ADSORBED FILM

FIELD OF THE PRESENT INVENTION

The present invention relates to laminated chemically adsorbed monomolecular films based on fluorocarbon and a method of manufacturing the same.

More specifically, it concerns laminated chemically adsorbed monomolecular films based on fluorocarbon with a purpose of replacing conventional fluorocarbon-based coating films in which it is desirable to have water- and oil-repelling properties or hydrophilic and oil-repelling properties and which may be used for electronic products, vehicles, industrial devices and so forth. It further relates to siloxane-based monomolecular films or laminated monomolecular films.

More specifically, it concerns highly hydrophilic or water-repelling, heat-resistant, siloxane-based monomolecular films or laminated monomolecular films, which are formed to have thicknesses at the nanometer level for improving the durability of the surface of hydrophilic substrates.

It further relates to a method of laminating a chemical monomolecular film onto a chemical monomolecular film, and also to materials for chemical adsorption.

BACKGROUND OF THE INVENTION

In the prior art, there are many methods of coating various silicone-based resins to improve the separating, water-repelling, electrically insulating, water-resistant, heat-resistant, humidity-resistant, weather-resistant, solvent-resistant and other properties concerning the durability of various substrates. However, the silicone resins have low transparency. Therefore, if they are to be coated while retaining the color tone or luster of the substrate, coating should be very thin. However, the silicone resins have low hardness and hence inferior scratch-resistant property. This means that reducing the coating film thickness leads to deterioration of the durability. Accordingly, it has been proposed to increase the hardness of the coating film by making use of crosslinking reactions obtained by introducing epoxy groups or vinyl groups into the molecules of the silicone resins or increase the hardness of the coating film by incorporating such fillers as fine particles of silica, alumina, antimony, etc.

In another aspect, in an extensively employed well-known method of manufacturing fluorocarbon-based coating films, the surface of a metal substrate such as aluminum, steel or stainless steel is roughened by means of wire brushes or chemical etching, then a primer is coated. A paint prepared by suspending fine particles of a fluorocarbon-based material such as ethylene polytetrafluoride in ethanol or the like, is coated. Then, the substrate is dried and baked at a temperature of about 400° C. for about one hour, thus fixing a fluorocarbon-based polymer on the substrate surface.

With this method, the polymer coating can be readily obtained. However, since the polymer is bonded to the substrate merely by an anchor effect, its adhesion to the substrate is limited. In addition, the coating film surface is flattened because of the baking at a high temperature of 400° C. Therefore, a satisfactory water- and oil-repelling surface can not be obtained. Therefore, this method is insufficient for devices which desirable have water- and oil-repelling coating films, such as electric products, vehicles and industrial devices.

Further, there are methods of plasma treatment for rendering the surface of fluorocarbon-based coating films hydrophilic. However, none of them permits satisfactory characteristics to be obtained.

SUMMARY OF THE INVENTION

In the light of the foregoing, it is an object of the invention to provide a method of manufacturing thin films, which have satisfactory adhesion to the substrate, are substantially free from pin holes and have excellent water- and oil-repelling properties or hydrophilic and oil-repelling properties. These films can replace fluorine-based coating films, thus permitting improvement of the performance of devices requiring a coating having the water- and oil-repelling, hydrophilic and oil-repelling, heat-resistant, weather-resistant or wear-resistant properties. These properties are desirable in electric products, vehicles and industrial devices.

A further object of the invention is to provide a silicone-based coating film, which can be thinly formed while retaining the color tone or luster of the substrate and has a superior scratch-resistant property.

According to a first aspect of the invention we provide a chemically adsorbed laminated film comprising a fluorocarbon chain formed on a substrate surface by a covalent —Si— bond and a chemically adsorbed monomolecular laminated film formed on said fluorocarbon chain film by a —Si— bond.

It is preferable in this invention that the chemically adsorbed chains contain fluorine groups at an outermost end layer.

It is preferable in this invention that the covalent bond is a —SiO— bond.

It is preferable in this invention that the surface of the outermost monomolecular layer has hydroxyl groups, the laminated chemically adsorbed film having hydrophilic and oil-repelling properties.

It is preferable in this invention that the surface of the outermost monomolecular layer has fluorocarbon groups, the laminated chemically adsorbed film having water- and oil-repelling properties.

It is preferable in this invention that the substrate is made of the member of a group consisting of metals, ceramics, glass and plastics.

According to a second aspect of the invention we provide a chemically adsorbed film comprising a siloxane-based molecular chain formed on a substrate surface by a covalent —Si— bond and a chemically adsorbed film layer formed on said molecular chain oriented substantially vertically to said substrate surface.

It is preferable in this invention that the chemically adsorbed film layer is a single monomolecular film or monomolecular laminated film.

It is preferable in this invention that the surface of the outermost molecular layer has hydrophilic groups.

According to a third aspect of the invention we provide a method of manufacturing a laminated film by a chemical adsorption process comprising the steps of:

(A) contacting a substrate surface with a non-aqueous solution containing a chemical adsorption material having a fluorocarbon chain and end reactive groups, the substrate surface having active hydrogen groups;

(B) removing unreacted chemical adsorption material remaining on the substrate by washing the substrate with a non-aqueous organic solution to form an adsorbed monomolecular precursor film;

(C) reacting unreacted chlorosilane groups on the adsorbed monomolecular precursor film with water after the removal step;

(D) drying the adsorbed monomolecular precursor film to form an inner layer;

(E) contacting the inner layer surface with a non-aqueous solution containing a chemical adsorption material having a fluorocarbon chain and at least one end reactive group, the substrate surface having active hydrogen groups; and (F) repeating steps (B) to (D) to form an outer layer.

It is preferable in this invention that the reactive group of the chemical adsorption material forming the outer layer is at least one member of the group consisting of a halosilyl group, an alkoxysilyl group, a halotitanium group, and an alkoxyl titanium group.

It is preferable in this invention that the chemical adsorption material for forming the inner layer is represented by the formula $$X_pCl_{3-p}Si\text{—}R^1\text{—}(CF_2)_n\text{—}R^2\text{—}SiX_qCl_{3-q}$$

(where n represents an integer, $R^1$ and $R^2$ represent an alkylene group or a substituted group containing a Si, an oxygen atom or a chemical bond, X represents a substituted group for a hydrogen atom, an alkyl or alkoxyl group, and p and q represent 1 or 2).

It is preferable in this invention that the chemical adsorption material forming the outer layer is represented by the formula $$R^3\text{—}R^4\text{—}(CF_2)_n\text{—}R^5\text{—}SiX_pCl_{3-p}$$

(where n represents an integer, $R^3$ represents an unsaturated group or a dimethylsilyl group, $R^4$ and $R^5$ represent an alkylene group or a substituted group containing a Si or an oxygen atom or a chemical bond, X represents a substituted group for a H, a halogen atom, an alkyl group or an alkoxyl group, and p and q represent 1 or 2).

It is preferable in this invention that the chemical adsorption material forming the outer layer is represented by the formula $$HSi(CH_3)_2\text{—}(CF_2)_n\text{—}R^6\text{—}SiX_pCl_{3-p}$$

(where n represents an integer, $R^6$ represents an alkylene group or a substituted group containing a Si or an oxygen atom or a chemical bond, X represents a substituted group for a H, a halogen atom, an alkyl group, or an alkoxyl group and p and q represent 1 or 2, and the HSi $(CH_3)_2$— group is converted to the HO— group).

It is preferable in this invention that the chemical adsorption material forming the outer layer is represented by the formula $$CH_2\text{=}CH\text{—}(CF_2)_n\text{—}R^7\text{—}SiX_pCl_{3-p}$$

(where n represents an integer, $R^7$ represents an alkylene group or a substituted group containing a Si or an oxygen atom or a chemical bond, X represents a substituted group for a H, a halogen atom, an alkyl group or an alkoxyl group, and p represents 0 or 1 or 2, and the chlorosilyl group is converted to an active functional group through energy beam irradiation in a reactive gas atmosphere).

It is preferable in this invention that the active hydrogen groups on the surface are at least a member of the group consisting of a hydroxyl group, an amino group, an imino group and a carboxyl group, and said substrate is made of a material selected from the group consisting of metals, ceramics, plastics and glass.

It is preferable in this invention that the substrate has hydroxyl groups on the surface and is a plastic substrate with the surface thereof rendered hydrophilic by treating in an oxygen-containing plasma or corona atmosphere.

According to a third aspect of the invention we provide a method of manufacturing a chemically adsorbed monomolecular film by a chemical adsorption process comprising the steps of:

(a) contacting a substrate surface with a non-aqueous solution containing a chemical adsorption material having a straight chain siloxane molecule and at least one reactive group, the substrate surface having active hydrogen groups;

(b) removing unreacted chemical adsorption material remaining on the substrate by washing the substrate with a non-aqueous organic solution to form an adsorbed monomolecular precursor film;

(c) reacting unreacted chlorosilane groups on the adsorbed monomolecular precursor film with water after the removal step; and (d) drying the adsorbed monomolecular precursor film to form a monomolecular film.

It is preferable in this invention that the chemical adsorption material forming the monomolecular film is represented by the formula $$\begin{array}{c} Q_1 \\ | \\ Z(SiO)_nSiCl_3 \\ | \\ Q_2 \end{array}$$

(where n represents an integer, Z represents an alkyl, an alkene, an alkyne, an aryl, cycloalkyl, or those denaturation group, $Q_1$, and $Q_2$ represents an alkyl group or a substituted group containing a Si or an oxygen atom).

It is preferable in this invention that the chemical adsorption material forming the monomolecular inner layer film is represented by the formula $$Cl_{3-p}SiX_pO(A)_rSiX_pCl_{3-p}, \text{ or}$$

$$\begin{array}{c} Q_1 \\ | \\ Cl_3SiO(SiO)_nSiCl_3 \\ | \\ Q_2 \end{array}$$

(where n represents an integer, $Q_1$, and $Q_2$ represents an alkyl group or a substituted group containing a Si or an oxygen atom, A represents functional group containing SiO, X represents a substituted group for a H, halogen atom, an alkyl or an alkoxyl group, and p and q represent 1 or 2, r represents an integer), and the laminated film is formed on the inner layer film.

According to the invention, a siloxane-based or fluorine-based monomolecular laminated film containing at least fluorine can be formed on a given substrate surface in a laminated state and through chemical bonds (or covalent bonds) with the substrate, it is possible to obtain a laminated film, which has satisfactory adhesion to the substrate, is substantially pin-hole free and has is very thin.

In addition, since the outermost layer may be substituted by fluorocarbon groups or hydroxyl groups, it is possible to obtain a film, which has excellent water- and oil-repelling properties or hydrophilic and oil-repelling properties and can replace fluorine-based coating films, thus permitting improvement of the performance of products requiring a coating having water- and oil-repelling properties, hydrophilic and oil-repelling properties, heat-resistant property, weather-resistant property, wear-resistant property and so forth which are desirable in electric products, vehicles, industrial devices and so forth. Further, the method of manufacture according to the invention forms the laminated film efficiently, effectively and uniformly.

DETAILED DESCRIPTION OF THE INVENTION

Figure 1A:
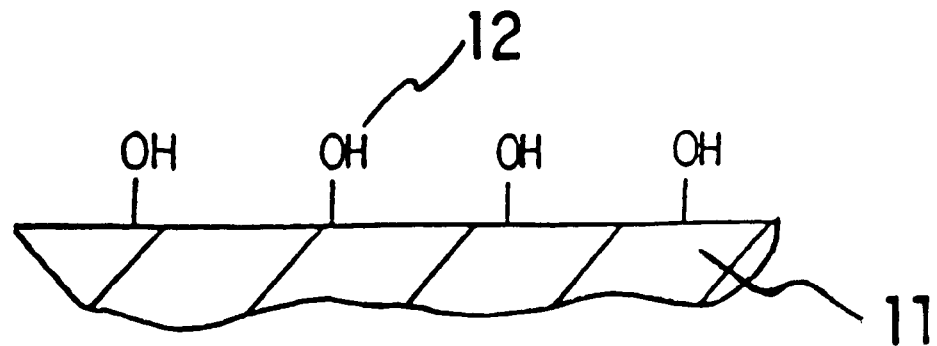
FIGS. 1(a)–(c) show a method of manufacturing a hydrophilic and oil-repelling laminated chemically adsorbed monomolecular film based on carbon fluoride with the surface thereof covered by hydrophilic groups as in example 1 of the invention.

The laminated monomolecular film based on fluorocarbon according to the invention may obtained by using almost any straight chain chlorosilane-based surface active material, the molecule of which has chlorosilane groups (i.e., $SiCl_nX_{3-n}$ groups, where X represents a functional group) at opposite ends and a fluorocarbon chain in the remainder. It is particularly convenient to use, as the chemical adsorption material based on carbon fluoride containing a plurality of chlorosilyl groups at the molecular ends,

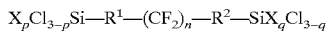

(where n represents an integer, $R^1$ and $R^2$ represent an alkyl group or a substituted group containing a silicon or an oxygen atom or a chemical bond, X represents a substituted group for a hydrogen atom or an alkyl group, and p and q represent 1 or 2), or $CF_3—(CF_2)_n—Z—SiX_qCl_{3-q}$ (where n is an integer, Z represents an alkyl group or a substitute group containing a Si or an oxygen atom or a chemical bond, and q repreesnts 0, 1 or 2).

For laminating other chemically adsorbed monomolecular layers based on fluorocarbon according to the invention, it is possible to use almost any straight chain chemical adsorption material based on chlorosilane, the molecule of which has a chlorosilane ($SiCl_nX_{3-n}$, n representing an integer ranging from 1 to 3, X representing a substituted group) group at one end, an unsaturated group at the other end and a carbon fluoride chain in the remainder. Particularly conveniently, as the surface active material based on carbon fluoride may be used $R^3—R^4—(CF_2)_n—R^5—SiX_pCl_{3-p}$ (where n represents an integer, $R^3$ represents an unsaturated group or a dimethylsilyl group, $R^4$ and $R^5$ represent an alkyl group or a substituted group containing a silicon or an oxygen atom or a chemical bond, X represents a substituted group for a hydrogen atom or an alkyl group, and p and q represent 1 or 2). As a reagent, for example, the following compounds may be used; $Cl_3Si(CH_2)_2(CF_2)_6(CH_2)_2SiCl_3$, $CF_3(CF_2)_7(CH_2)_2SiCl_3$, $HSi(CH_3)_2(CH_2)_2(CF_2)_6(CH_2)_2SiCl_3$, and $CH_2=CH—(CF_2)_6(CH_2)_2SiCl_3$.

According to the invention, a monomolecular film or a laminated monomolecular film based on siloxane having a thickness at the nanometer level may be formed as a layer chemically bonded to the substrate surface. It is thus possible to obtain a coating film, which will not spoil the color tone or luster instrinsic to the substrate and has an enhanced scratch-resistant property. This means that it is possible to improve the separating property, water-repelling property, electrically insulating property, water-proof property, heat-resistant property, weather-resistant property and other durability properties of the substrate. Further, it is possible to make the surface of the film water-repelling or hydrophilic.

The siloxane-based monomolecular film having a thickness at the nanometer level may be obtained by a method, which comprises a step of dipping and holding a thoroughly washed hydrophilic substrate in a non-aqueous organic solution containing a straight chain chlorosilane-based surface active material with the molecule thereof having a chlorosilane ($SiCl_nX_{3-n}$, n represents an integer ranging from 1 to 3, X represens a substituted group) group at one end, for example, $V—(SiW_2O)_n—SiCl_3$ (where V and W represent a functional group, and n represents an integer) for causing a reaction between molecules of the siloxane-based chemical adsorption material (same to surface active material) and hydroxyl groups present on the substrate surface to thereby chemically adsorb the surface active material and a subsequent step of washing excess siloxane-based surface active material away from the substrate by using a non-aqueous organic solution and then reacting with water.

A hydrophilic siloxane-based monomolecular film, which is covered by hydrophilic hydroxyl groups, may be obtained by a method, which comprises a step of dipping a thoroughly washed hydrophilic substrate in a non-aqueous organic solution containing a straight chain chlorosilane-based surface active material having chlorosilyl groups at the molecule ends, for example

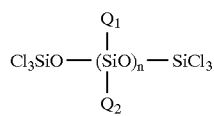

(where $Q_1$, $Q_2$ represents a functional group, and n represents an integer), thereby chemically adsorbing the siloxane-based surface active material to the substrate surface, and a subsequent step of washing excess siloxane-based surface active material away from the substrate by using a non-aqueous organic solution and then reacting with water.

Subsequent to this process, a siloxane-based monomolecular two-layer film having a water-repelling surface, may be obtained by a method, which comprises a step of dipping the substrate in a non-aqueous organic solution containing a straight chain chlorosilane-based surface active material, the molecule of which has a chlorosilane group at one end, for example, $Cl_3SiO—(SiQ_2O)_n—SiCl_3$ (where Q represents an alkyl group, and n represents an integer), for causing a reaction between molecules of the siloxane-based surface active material and hydroxyl groups present on the substrate surface and a subsequent step of washing excess siloxane-based surface active material away from the substrate by using a non-aqueous organic solution and then reacting with water. Meanwhile, a siloxane-based monomolecular two-layer film, which is covered by hydrophilic hydroxyl groups, may be obtained by using a straight chain chlorosilane-based surface active material, the molecule of which has a chlorosilane group at one end, for instance

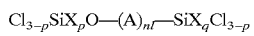

(where A represents an alkylene group, and n represents an integer, in lieu of the straight chain chlorosilane-based surface active material, the molecule of which has a chlorosilane group at one end.

In carrying out our invention in one preferred mode, the monomolecular film is formed by utilizing the reaction between an active hydrogen group such as a hydroxyl group (—OH), an amino group (—NH$_2$), an imino group (=NH), a carboxyl group (—COOH) on the substrate surface, and a functional group, such as a chlorosilyl group, at one end of the molecule to be adsorbed. The rate of formation of the adsorbed film and the saturated adsorption of the film are greately affected by the concentration of the adsorbed material, the temperature, the speed of reaction between the substrate surface and the adsorption molecules, the shape of the adsorption molecules, the number of hydroxyl groups on the substrate surface, the state of the substrate surface and so forth.

Since the chemically adsorbed film according to the invention utilizes molecules having functional groups capable of reacting with active hydrogen groups, the atmosphere of the adsorption film formation step is as low in relative humidity as possible. Desirably, the humidity is at a perfectly dry state.

The substrate according to the invention is by no means limited so long as its surface contains active hydrogen groups such as —OH, —COOH, —NH$_2$ or =NH groups. Examples of the substrate material are various kinds of glass such as quartz glass, fluoride glass and metal glass, metals such as aluminum, iron, stainless steel, titanium, semiconductors such as silicon and germanium, and plastics such as polypropylene, polystyrene, polyethylene and acryl resin. Substrates with less surface hydrophilic groups, for instance plastic substrates, may be made suitable according to the invention by increasing the hydrophilic groups through ordinary chemical treatment means such as ozone oxidation or electron beam irradiation. Polyimide resins and polyurethane resins have surface imino groups (=NH) and therefore do not require any pre-treatment. As an alternative pre-treatment means effective for the surface of substrates such as glass, metals, ceramics and plastics, silica (SiO$_2$) can be deposited or polyhalogenated silane, such as dichlorosilane, trichlorosilane and tetrachlorosilane, can be coated and reacted with water. The pre-treatment can be with or without washing with a non-aqueous solution and increases the formation of silanol (—SiOH) groups on the substrate surface. By so doing, the chemical adsorbing material can be reacted at a high concentration.

According to the invention, any organic solvent may be used so long as it is a non-aqueous organic solvent, does not attack the substrate and permits sufficient dissolution of the chemical adsorbing material, since the chemical adsorbing material is reacted with hydrous molecules. Examples of the organic solvent are long chain alkyl-based solvents, aromatic hydrocarbon-based solvents, aliphatic hydrocarbon-based solvents and halogen-containing solvents.

EXAMPLE 1

As shown in FIG. 1(a), a hydrophilic glass substrate 11 was prepared. If plastic or like water-repelling substrates are to be dealt with instead of metal, ceramic, glass and other substrate with the surface thereof oxidized, their surface may be oxidized to be hydrophilic by treating them with dichromic acid. After a thorough drying, the substrate was dipped and held for about two hours in a solution of 80 wt. % hexadecane (or toluene or xylene or bicyclohexyl), 12 wt. % of carbon tetrachloride and 8 wt. % of chloroform, the solution containing a chemical adsorbed material having two trichlorosilyl groups at molecule ends, for example,

to a concentration of about 2 wt. %. Since the surface of the glass substrate 11 contained many hydroxyl groups 12, a hydrochloric acid elimination reaction (dehydrochlorination reaction) was thus brought about between —SiCl groups at either end of the molecules of the chemical adsorbed material, producing bonds represented by the formula [1];

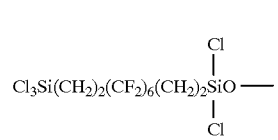

[Formula 1]

over the entire substrate surface.

Subsequently, the substrate was washed well using an organic solvent (i.e., chloroform) to remove excess chemical adsorbed material remaining on its surface, and then washed with water and dried. As a result, a siloxane-based monomolecular layer 13 represented by the formula [2];

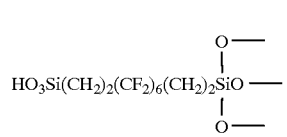

Figure 1B:
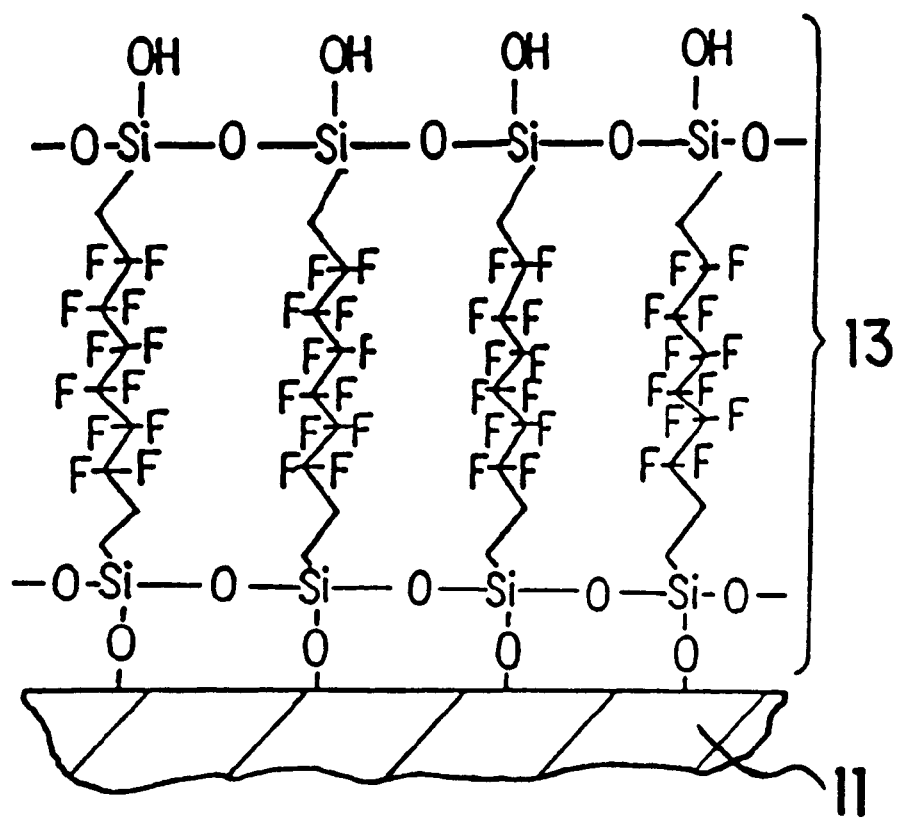

[Formula 2]

was formed such that it was secured by chemical bonds (or covalent bonds) to the substrate surface. The chemical bond is via a siloxane bond. The formation of the chemically adsorbed monomolecular film was measured by FTIR spectrometry and the thickness was about 1.5 nanometers (nm), as shown in FIG. 1(b). It was firmly bonded such that it did not separate.

Figure 1C:
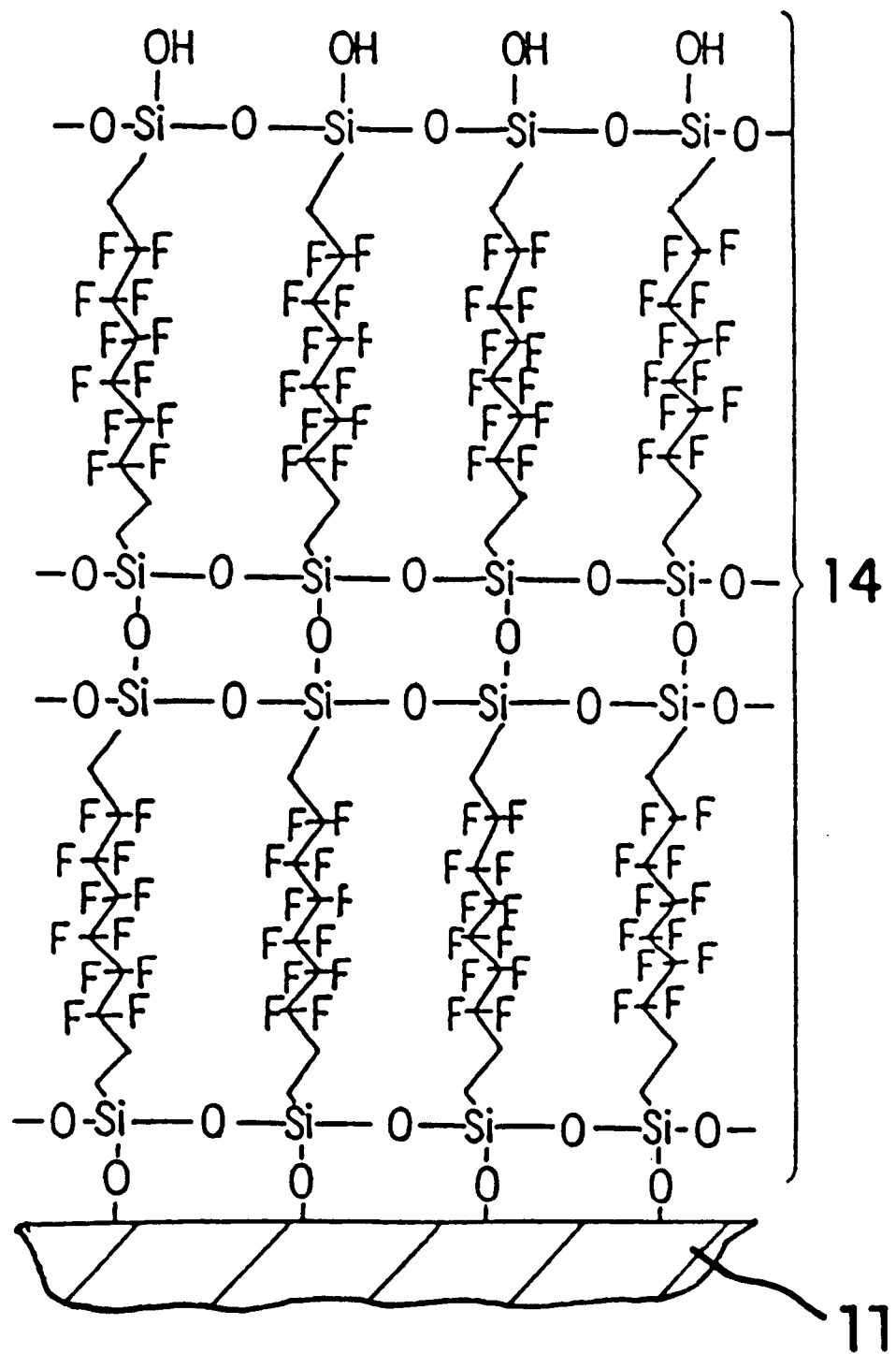

By subsequently carrying out the steps from the chemical adsorption step to the water washing and drying step, a bi-layer (di-molecular) 14 as shown in FIG. 1(c) was obtained. The formation of the chemically adsorbed monomolecular film was measured by FTIR spectrometry and the thickness was about 3.0 nanometers (nm). It was firmly bonded such that it did not separate.

Likewise, by repeating the steps from the chemical adsorption step to the water washing and drying step for a required number of layers, a laminated monmolecular chemically adsorbed film based on fluorocarbon was obtained, the surface of which was covered by hydroxyl groups, and which was hydrophilic and oil-repelling and had a very high adhesion.

EXAMPLE 2

After forming the bi-layer laminated monomolecular film in Example 1, the substrate with the laminated film was dipped and held for about two hours in a solution of 80 wt. % of hexadecane (or toluene or xylene or bicylcohexyl), 12 wt. % of carbon tetrachloride and 8 wt. % of chloroform, the solution containing a chemically adsorbed material, the molecule of which had a trichlorosilyl group at one end and had the other end substituted by carbon trifluoride, for example $CF_3(CF_2)_7$—$(CH_2)_2$—$SiCl_3$ to a concentration of 2 wt. %. Since the surface of the laminated film contained many hydroxyl groups 22, a dehydrochlorination reaction was brought about between the —SiCl groups of the chemical adsorbed material and the hydroxyl groups of the laminated film, thus producing bonds represented by the formula [3] over the entire substrate surface.

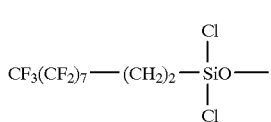

[Formula 3]

The substrate was then washed well with an organic solvent (i.e., chloroform) to remove non-reacted chemical adsorbed material remaining on its surface, and then washed with water. As a result, a monomolecular layer 22 represented by the formula [4] was formed.

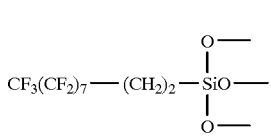

[Formula 4]

Figure 2:
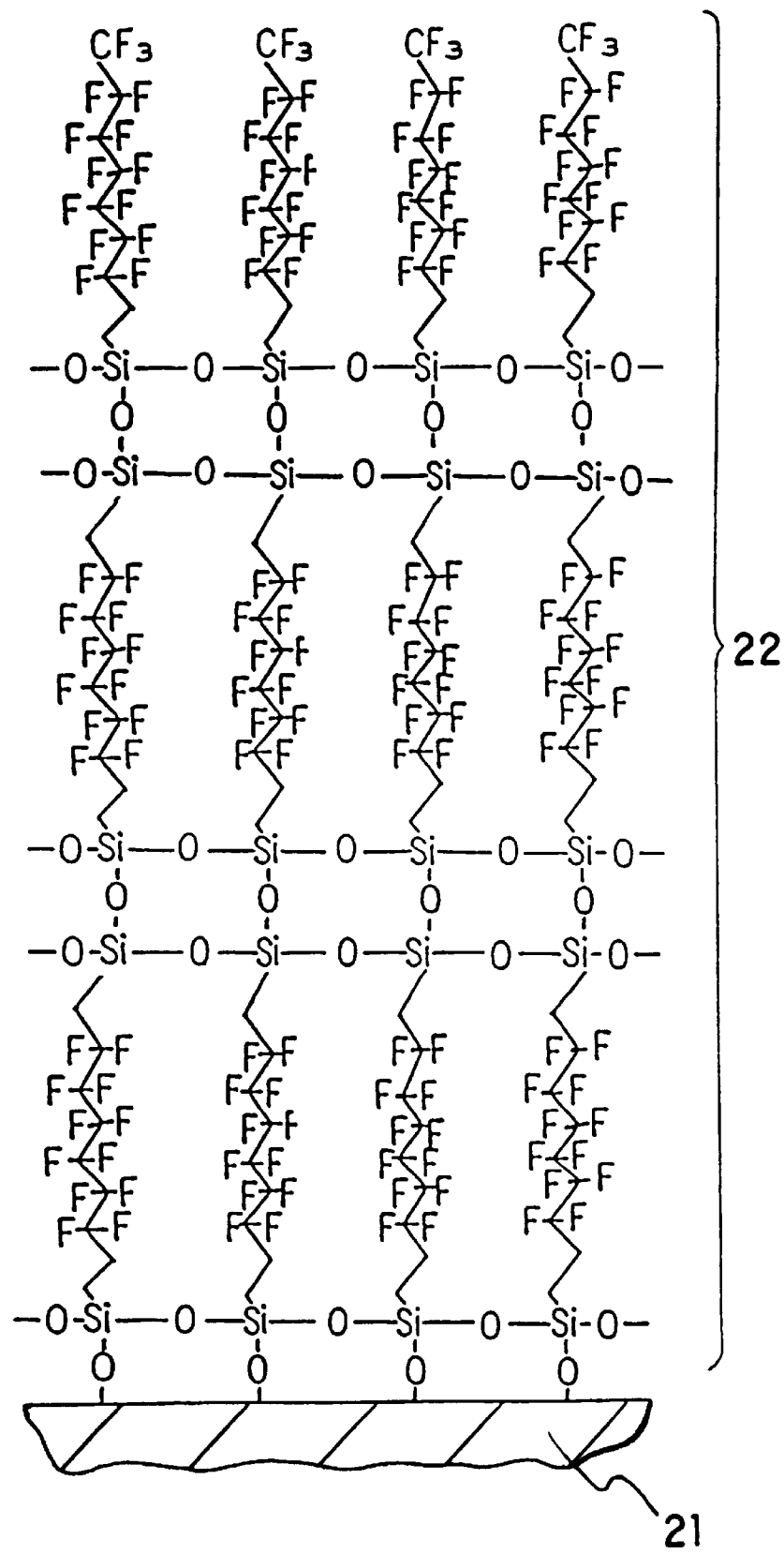
FIG. 2 shows a method of manufacturing a water- and oil-repelling laminated chemically adsorbed monomolecular film based on carbon fluoride with the surface thereof covered by carbon fluoride groups as in example 2 of the invention.

Thus, a laminated chemically adsorbed monomolecular film 22 based on fluorocarbon was obtained, the surface of which was covered by fluorocarbon groups, and which was excellent water- and oil-repelling and had a very high adhesion, as shown in FIG. 2.

While in the above Examples 1 and 2, $Cl_3Si(CH_2)_2(CF_2)_6(CH_2)_2SiCl_3$ and $CF_3(CF_2)_7(CH_2)_2SiCl_3$ were used, other compounds may be used as well. Examples of such compounds are

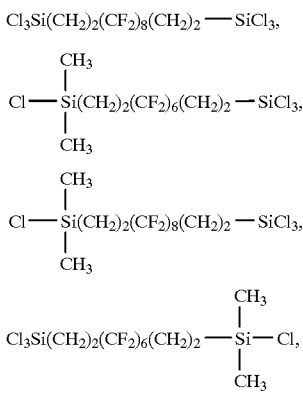

$CF_3(CF_2)_9(CH_2)_2$—$SiCl_3$, $CF_3(CF_2)_5(CH_2)_2$—$SiCl_3$, $CF_3CH_2O(CH_2)_{15}SiCl_3$, $CF_3(CH_2)_2Si(CH_3)_2(CH_2)_{15}SiCl_3$, $CF_3(CF_2)_2Si(CH_3)_2(CH_2)_9SiCl_3$, and $CF_3COO(CH_2)_{15}SiCl_3$.

EXAMPLE 3

Figure 3A:
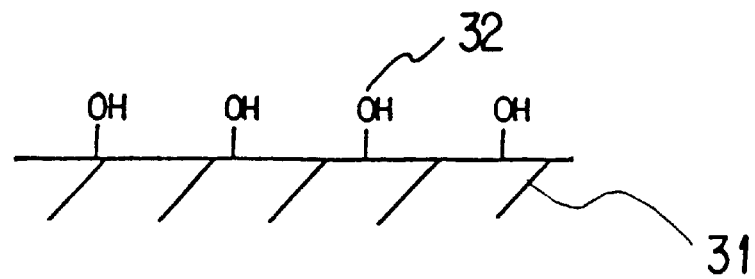
FIGS. 3(a)–(d) show a method of manufacturing a hydrophilic oil-repelling laminated chemically adsorbed film based on carbon fluoride with the surface thereof covered by hydrophilic groups as in example 3 of the invention.

As shown in FIG. 3(a), a hydrophilic ceramic substrate 31 was prepared. After thoroghly drying, the substrate was dipped and held for about two hours in a solution of 80 wt. % hexadecane (or toluene or xylene or bicyclohexyl), 12 wt. % of carbon tetrachloride and 8 wt. % chloroform, the solution containing a chemical adsorbed material, the molecule of which had a trichlorosilyl group at one end and had a vinyl group at the other end, for example;

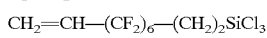

$CH_2$=$CH$—$(CF_2)_6$—$(CH_2)_2SiCl_3$

Since the surface of the ceramic substrate contained many hydroxyl groups 32, a dehydrochlorination reaction was brought about between the —SiCl groups of the chemical adsorbed material and the hydroxyl groups of the substrate surface. A monomolecular layer 33 represented by the formula [5];

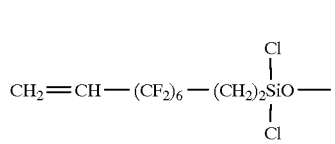

[Formula 5]

was formed over the entire substrate surface.

The substrate was then washed with freon 113 to remove the unreacted material remaining on the surface, followed by washing with water or exposing to air containing moisture. The —SiCl group was changed to a —SiOH group as in formula [6].

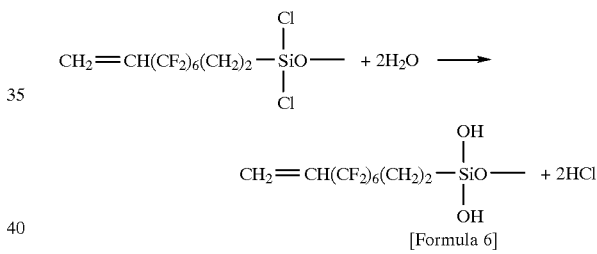

[Formula 6]

Each silanol group (—SiOH) was then dehydrated and crosslinked to form a siloxane bond (—SiO—) after drying as in formula [7]. Drying temperature may be room temperature or above.

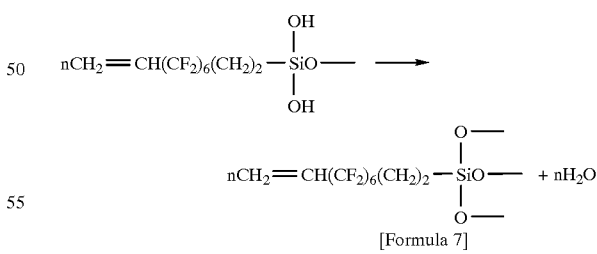

[Formula 7]

Figure 3B:
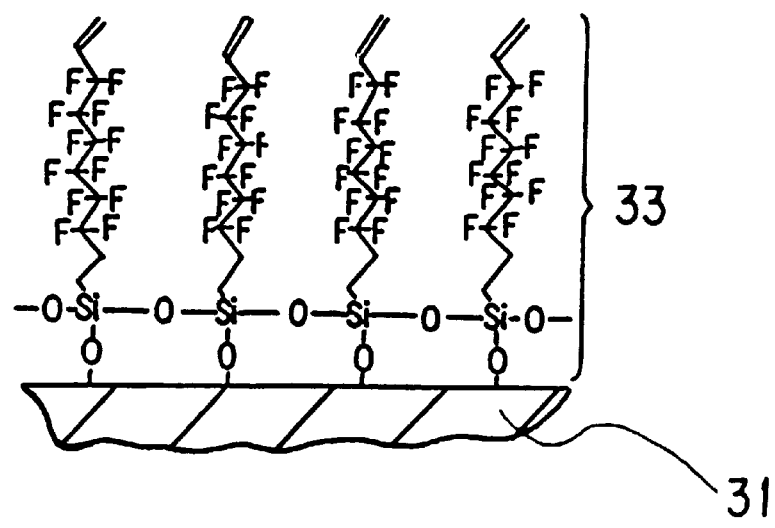

An adsorbed monomolecular film was obtained on the surface of the substrate as shown FIG. 3(b). The adsorbed monomolecular film has a fluorocarbon group 33 and is chemically bonded (i.e., covalently bonded) to the substrate. The chemical bond is via a siloxane bond. The formation of chemically adsorbed monomolecular film was measured by FTIR spectrometry and the thickness was about 1.5 nanometers (nm). It was firmly bonded such that it did not separate. FIG. 3(b).

The substrate was irradiated with an energy beam such as electron beam, ion beam, gamma ray or ultraviolet ray in a reactive gas atmosphere (for example irradiation with about 5 Mrads. of electron beam in air). As a result, a monomolecular layer 34 represented by formulas [8] to [10];

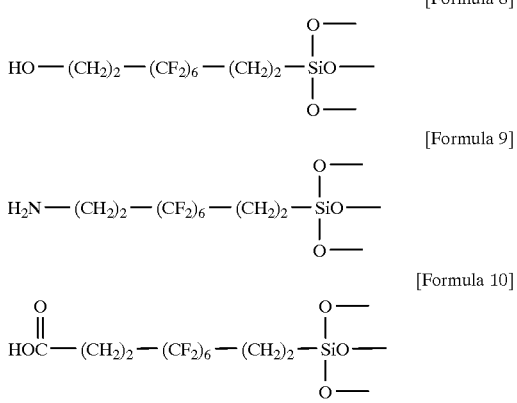

[Formula 8]

[Formula 9]

Figure 3C:
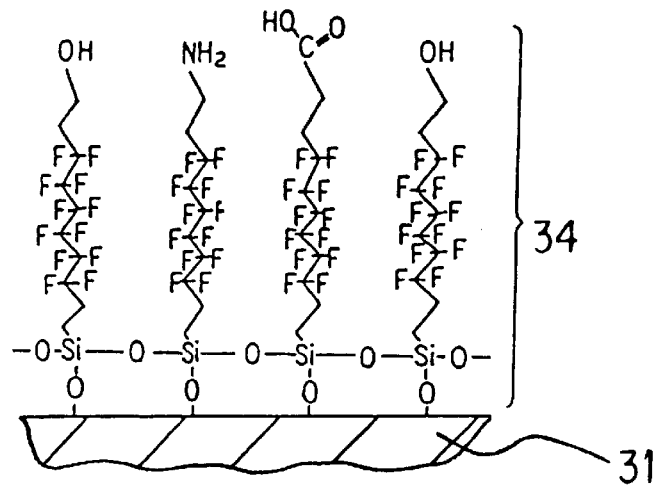

[Formula 10]

was formed such that it was chemically bonded to the surface, as shown in FIG. 3(c).

By carrying out the steps from the chemical adsoprtion step using

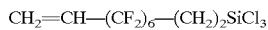

Figure 3D:
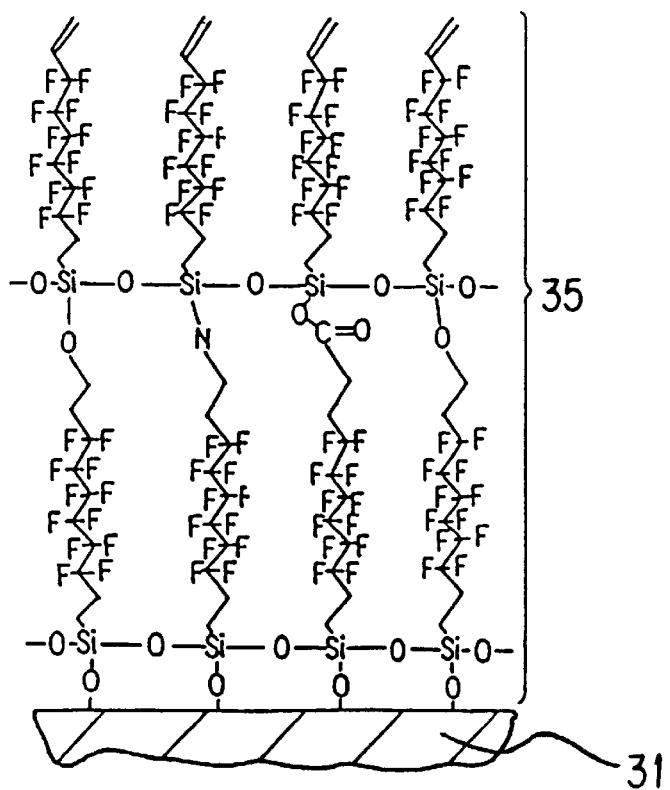

$CH_2=CH-(CF_2)_6-(CH_2)_2SiCl_3$ to the water washing step, a bi-layer film 35 containing fluorocarbon groups as shown in FIG. 3(d) was obtained.

Likewise, by repeating the steps from the chemical adsorption step to the energy beam irradiation step for a desired number of layers, a laminated chemically adsorbed monomolecular film was obtained, the surface of which was covered by hydroxyl groups and imino groups, and which was hydrophilic and oil-repelling and had a very high adhesion.

EXAMPLE 4

After forming the single-layer monomolecular film in Example 3, the substrate with the laminated film was dipped and held for two hours in a solution of 80 wt. % of hexadecane (or toluene or xylene or bicyclohexyl), 12 wt. % of carbon tetrachloride and 8 wt. % of chloroform, the solution containing a chemical adsorbed material with the molecule thereof having a trichlorosilyl group at one end and having the other end substituted by carbon trifluoride, for example,

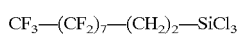

$CF_3-(CF_2)_7-(CH_2)_2-SiCl_3$ to a concentration of about 2 wt. %. Since the surface of the laminated film contained many hydroxyl and imino groups, a dehydrochlorination reaction was thus brought about between the —SiCl groups of the chemical adsorbed material and the hydroxyl groups of the laminated film. Bonds represented by the formula [11];

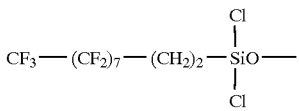

[Formula 11]

were thus produced over the entire substrate 41 surface.

Subsequently, the substrate was washed well with an organic solvent (i.e., chloroform) to remove non-reacted chemical adsorbed material remaining on its surface. A laminated chemically adsorbed monomolecular film 42 based on carbon fluoride was obtained by the formula [12];

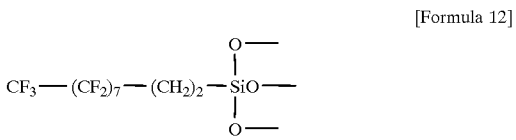

Figure 4:
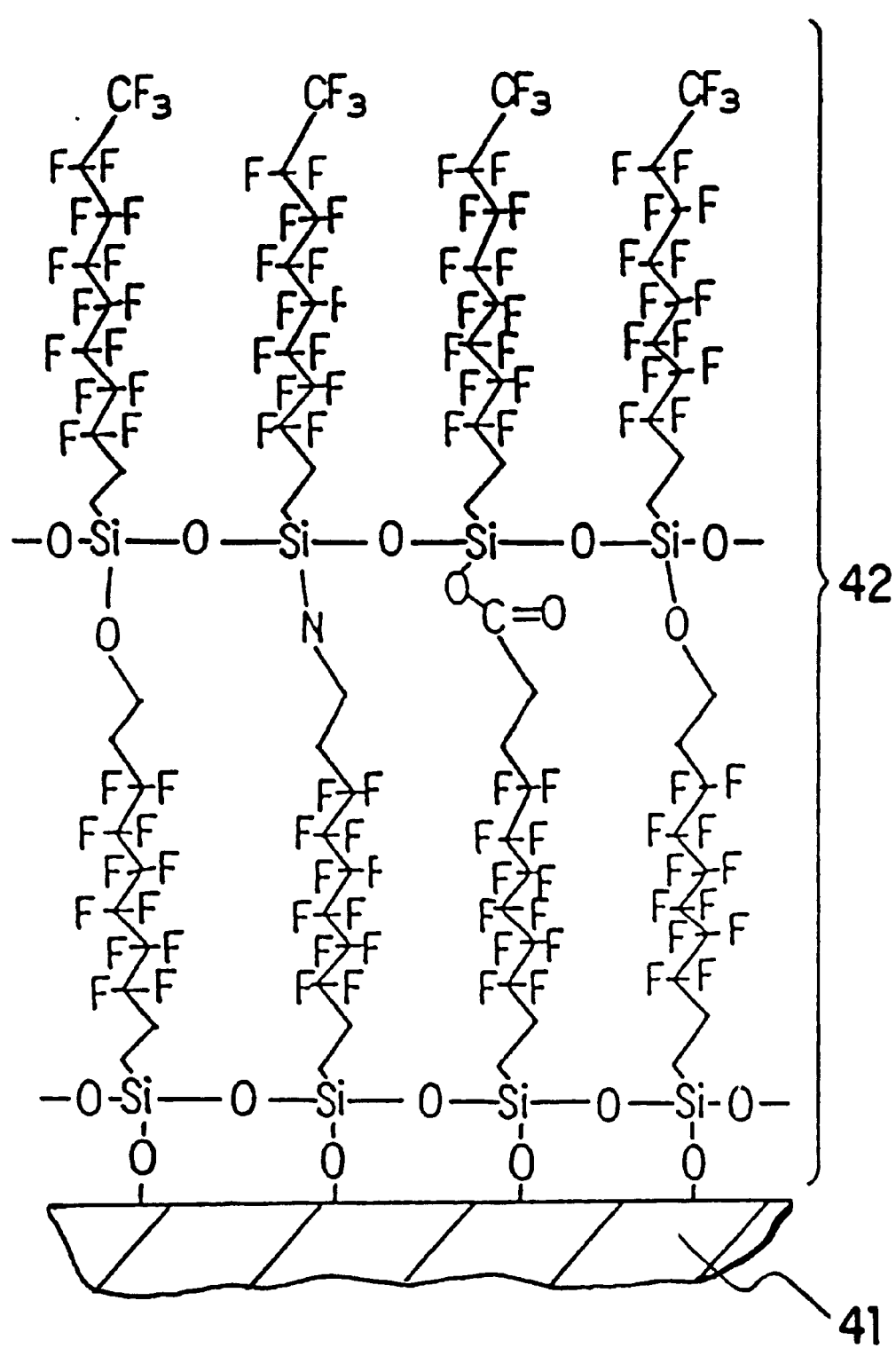
FIG. 4 shows a method of manufacturing a water- and oil-repelling laminated chemically adsorbed film based on carbon fluoride with the surface thereof covered by carbon fluoride groups as in example 4 of the invention.

[Formula 12]

which had its surface covered by carbon fluoride groups, was excellent water- and oil-repelling and had a very high adhesion, as shown in FIG. 4.

By using $Cl_3Si(CH_2)_2(CF_2)_6(CH_2)_2SiCl_3$ the last chemical adsorption step of this example, a laminated chemically adsorbed monomolecular film based on fluorocarbon, the surface of which is hydrophilic, was obtained.

Further, while in the above Examples 3 and 4, there were used $CH_2=CH-(CF_2)_6-(CH_2)_2-SiCl_3$, and $CF_3-(CF_2)_7-(CH_2)_2-SiCl_3$, other compounds may be utilized as well, for example $CH_2=CH-(CF_2)_8-(CH_2)_2-SiCl_3$, $CF_3-(CF_2)_9-(CH_2)_2-SiCl_3$, $CF_3-(CF_2)_5-(CH_2)_2-SiCl_3$, $CF_3CH_2O(CH_2)_{15}SiCl_3$, $CF_3(CH_2)_2Si(CH_3)_2(CH_2)_{15}SiCl_3$, and $CF_3COO(CH_2)_{15}SiCl_3$.

EXAMPLE 5

Figure 5A:
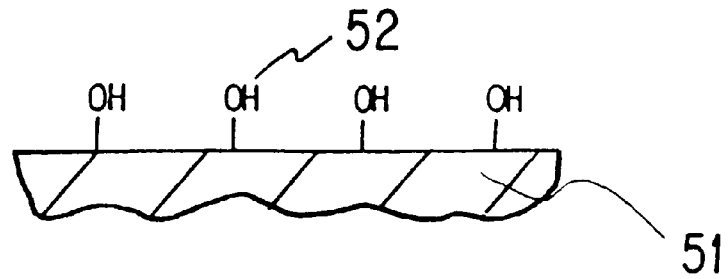
FIGS. 5(a)–(d) show a method of manufacturing a water- and oil-repelling laminated chemically adsorbed film based on carbon fluoride with the surface thereof covered by carbon fluoride groups as in example 5 of the invention.

As shown in FIG. 5(a), a hydrophilic aluminium substrate 51 was prepared. After drying well, the substrate was dipped and held in a solution of 80 wt. % of hexadecane (or toluene or xylene or bicyclohexyl), 12 wt. % of carbon tetrachloride and 8 wt. % of chloroform containing a chemical adsorbed material with the molecule thereof having a trichlorosilyl group at one end and having dimethylsilyl ($HSi(CH_3)_2-$) group at the other end, for example, $HSi(CH_3)_2(CH_2)_2(CF_2)_6(CH_2)_2SiCl_3$ to a concentration of about 2 wt. %. Since the surface of the hydrophilic substrate contained many hydroxyl groups 52, a dehydrochlorination reaction was brought about between the —SiCl groups of the chemical adsorbed material and the hydroxyl groups of the substrate surface. A monomolecular layer 53 as represented by formula [13];

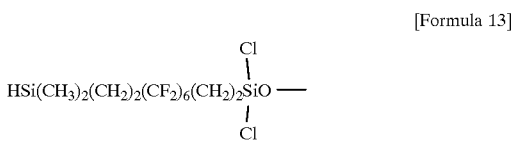

[Formula 13]

was formed over the entire substrate surface.

The substrate was then washed well with an organic solvent (i.e., chloroform) to remove non-reacted chemical adsorbed material remaining on its surface. A laminated chemically adsorbed monomolecular film 53 based on carbon fluoride was obtained by the formula [14];

[Formula 14]

Figure 5B:
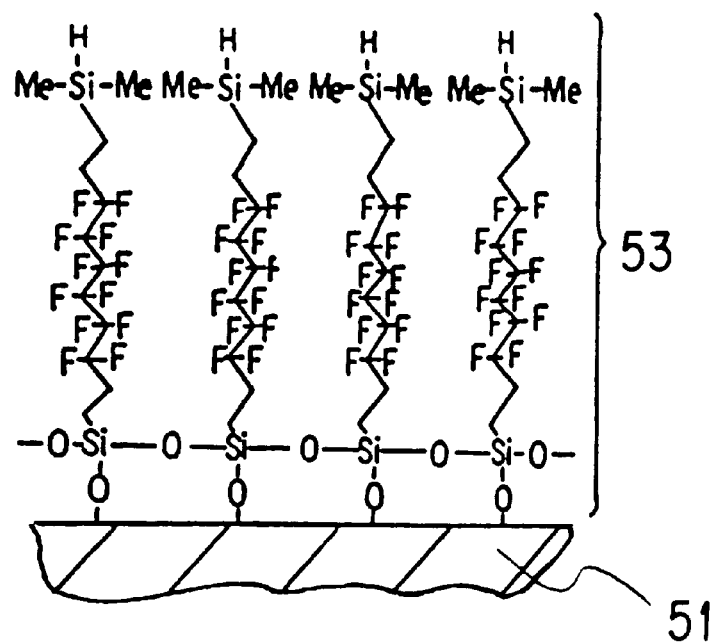

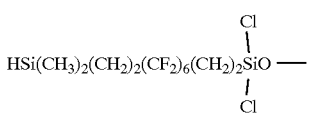

which had its surface covered by hydrocarbon groups, was water-repelling and had a very high adhesion, as shown in FIG. 5(b).

The substrate was then treated for about 10 hours with a $H_2O_2$ solution containing KF, $KHCO_3$, MeOH and THF. A monomolecular layer 54 represented by the formula [15];

[Formula 15]

Figure 5C:
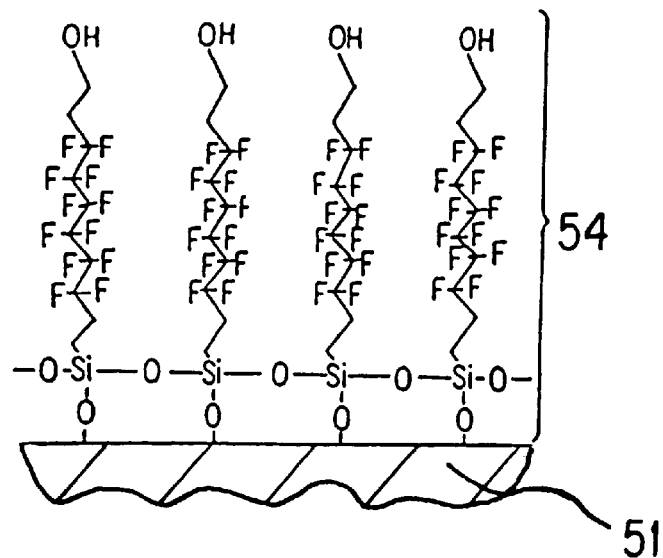

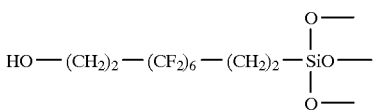

was thus formed such that it was chemically bonded to the surface, as shown in FIG. 5(c).

By subsequently carrying out the steps from the chemical adsorption step using

Figure 5D:
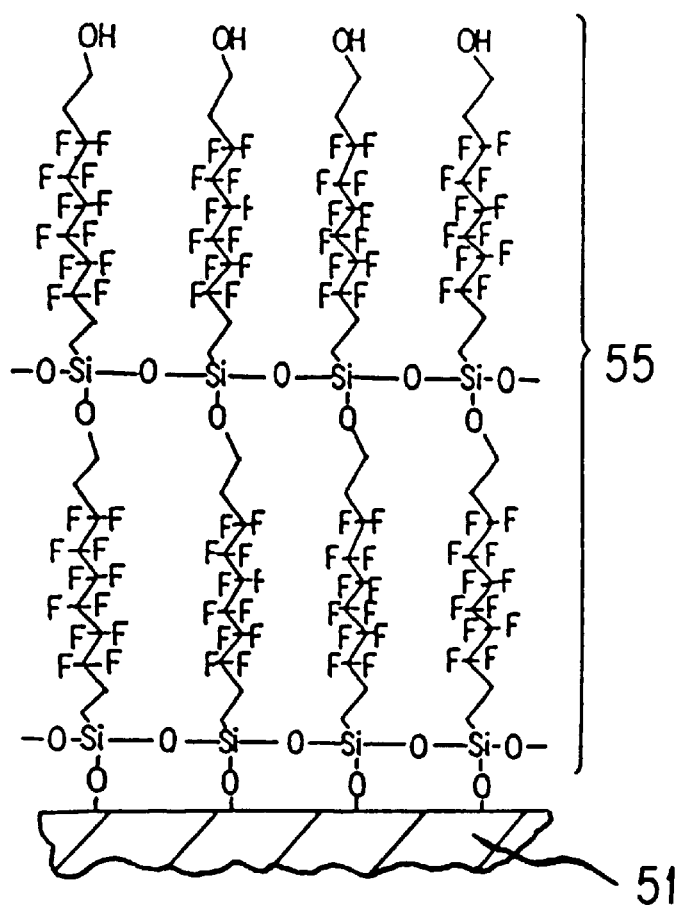

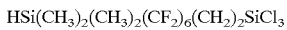

to the $H_2O_2$ treatment step, a laminated molecular film 55 containing carbon fluoride groups shown in FIG. 5(d) was obtained.

Likewise, by repeating the steps from the chemical adsorption step to the $H_2O_2$ treatment step for a desired number of layers, a laminated chemically adsorbed monomolecular film based on carbon fluoride could be obtained, which had its surface covered by hydroxyl groups, was hydrophilic and oil-repelling and had a very high adhesion.

By using

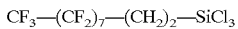

in the last chemical adsorption step in the above example, a laminated chemically adsorbed monomolecular film based on carbon fluoride, the surface of which is excellent water- and oil-repelling, can be obtained.

EXAMPLE 6

A polycarbonate substrate having a thickness of 1.2 mm and a diameter of 60 mm was fixed to another polycarbonate substrate, using a UV-setting adhesive. The substrate thus obtained was oxygen plasma treated in a UV dry stripper ("UV-1" manufactured by Samco International) at an oxygen flow rate of 1 l/min. for 10 minutes to oxidize the surface. The substrate was dipped and held in a freon 113 solution containing $10^{-2}$ mol/l of

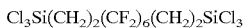

as the chlorosilane-based chemical adsorbed material containing a fluorocarbon group. This step was carried out in a nitrogen atmosphere at room temperature. Since the surface of the substrate contained hydroxyl groups, a dehydrochlorination reaction between the chlorosilyl groups of the chlorosilane-based chemical adsorbed material and the hydroxyl groups formed covalent bonds on the surface. This reaction is represented in above formula [1].

The substrate was then washed with freon 113 to remove the unreacted material remaining on the surface, followed by washing with water or exposing to air containing moisture. The —SiCl group was changed to a —SiOH group. Each silanol group (—SiOH) was then dehydrated and crosslinked to form a siloxane bond (—SiO—) after drying as in above formula [2]. Drying temperature may be room temperature or above.

An adsorbed monomolecular film was obtained on the surface of the substrate. The adsorbed monomolecular film has a fluorocarbon group and is chemically bonded (i.e., covalently bonded) to the substrate. The chemical bond is via a siloxane bond. The formation of the chemically adsorbed monomolecular film was measured by FTIR spectrometry and the thickness was about 1.5 nanometers (nm). It was firmly bonded such that it did not separate.

By subsequently carrying out the steps from the chemical adsorption step to the water washing and drying step, a bi-layer was obtained. The formation of the chemically adsorbed monomolecular film was measured by FTIR spectrometry and the thickness was about 3.0 nanometers (nm). It was firmly bonded such that it did not separate.

Likewise, by repeating the steps from the chemical adsorption step to the water washing and drying step for a required number of layers, a laminated monmolecular chemically adsorbed film based on fluorocarbon was obtained, the surface of which was covered by hydroxyl groups, and which was hydrophilic and oil-repelling and had a very high adhesion.

EXAMPLE 7

A Nylon-6,6 resin substrate having a thickness of 5.0 mm and a area of 100 mm×100 mm was dipped and held for about 30 minutes in a solution prepared by dissolving 1% by weight of a material containing a plurality of chlorosilyl groups, eg. , $SiCl_4$, $SiHCl_3$, $SiH_2Cl_2$ , and $Cl(SiCl_2O)_nCl_3$ (where n represents an integer in a range from 1 to 20) , being small in molecular size and greatly reactive with respect to imino groups, thus rendering the surface uniformly hydrophilic in a non-aqueous solvent, e.g., freon 113 solvent. As a result, a dehydrochlorination reaction was brought about due to imino >NH groups more or less present at the surface of the substrate, whereby a chlorosilane monomolecular film of the material containing a plurality of trichlorosilyl groups was formed.

As an example, using $SiCl_4$ as the material containing a plurality of chlorosilyl groups, a dehydrochlorination reaction was brought about on the surface due to a small quantity of hydrophilic —OH groups being exposed at the substrate surface. Molecules represented by formulas [16] and/or [17] were formed.

[Formula 16]

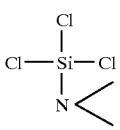

[Formula 17]

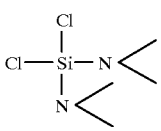

Those bonds were connected to the substrate surface by —SiO— bonds.

Subsequently, the substrate was washed with a non-aqueous solvent, e.g., freon 113 to remove unreacted $SiCl_4$ molecules, and then with water thus obtaining a siloxane monomolecular film at the substrate surface as shown by formulas [18] and/or [19].

[Formula 18]

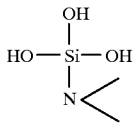

[Formula 19]

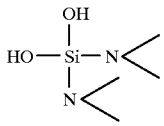

The monomolecular film was completely bonded by chemical bonds of —SiN< to the part surface and did not separate. In addition, its surface contained numerous silanol (—SiOH) bonds corresponding to about three times the initial number of imino groups.

As a further example, it was repeated same as example 6. An adsorbed monomolecular film was obtained on the surface of the substrate. The adsorbed monomolecular film has a fluorocarbon group and is chemically bonded (i.e., covalently bonded) to the substrate. The chemical bond is via a —SiN< bond. The formation of the chemically adsorbed monomolecular film was measured by FTIR spectrometry and the thickness was about 1.5 nanometers (nm). It was firmly bonded such that it did not separate.

By subsequently carrying out the steps from the chemical adsorption step to the water washing and drying step, a bi-layer was obtained. The formation of the chemically adsorbed monomolecular film was measured by FTIR spectrometry and the thickness was about 3.0 nanometers (nm). It was firmly bonded such that it did not separate.

Likewise, by repeating the steps from the chemical adsorption step to the water washing and drying step for a required number of layers, a laminated monmolecular chemically adsorbed film based on fluorocarbon was obtained, the surface of which was covered by hydroxyl groups, and which was hydrophilic and oil-repelling and had a very high adhesion.

EXAMPLE 8

Figure 6A:
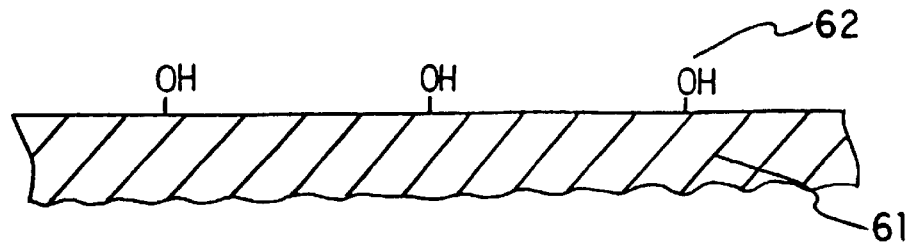
FIGS. 6(a)–(b) show a method of manufacturing a siloxane-based chemically adsorbed monomolecular film as in example 6 of the invention.

As shown in FIG. 6(a), a hydrophilic glass substrate 61 was prepared. If plastic or like oil-repelling substrates are dealt with instead of metal, ceramic, glass or other substrates with the surface thereof oxidized, their surface may be oxidized to be hydrophilic by treating them with dichromic acid. After thoroghly drying, the substrate was dipped and held in a solution of 80 wt. % of cyclohexane (or n-hexadecane, toluene, xylene or bicyclohexyl), 12 wt. % of carbon tetrachloride and 8 wt. % of chloroform, the con-taining a chemical adsorbed material having a single chlorosilyl group at a molecular end, for example, $(CH_3)_3SiO—(Si(CH_3)_2O)_6—SiCl_3$ at a concentration of 4 wt. %. Since the surface of the hydrophilic substrate contains many hydroxyl groups 62, a dehydrochlorination reaction was brought about between the —SiCl groups at either end of the chemical adsorbed material and the hydroxyl groups of the substrate. Bonds represented by the formula [20];

[Formula 20]

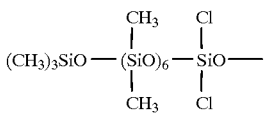

were thus produced over the entire substrate surface.

Figure 6B:
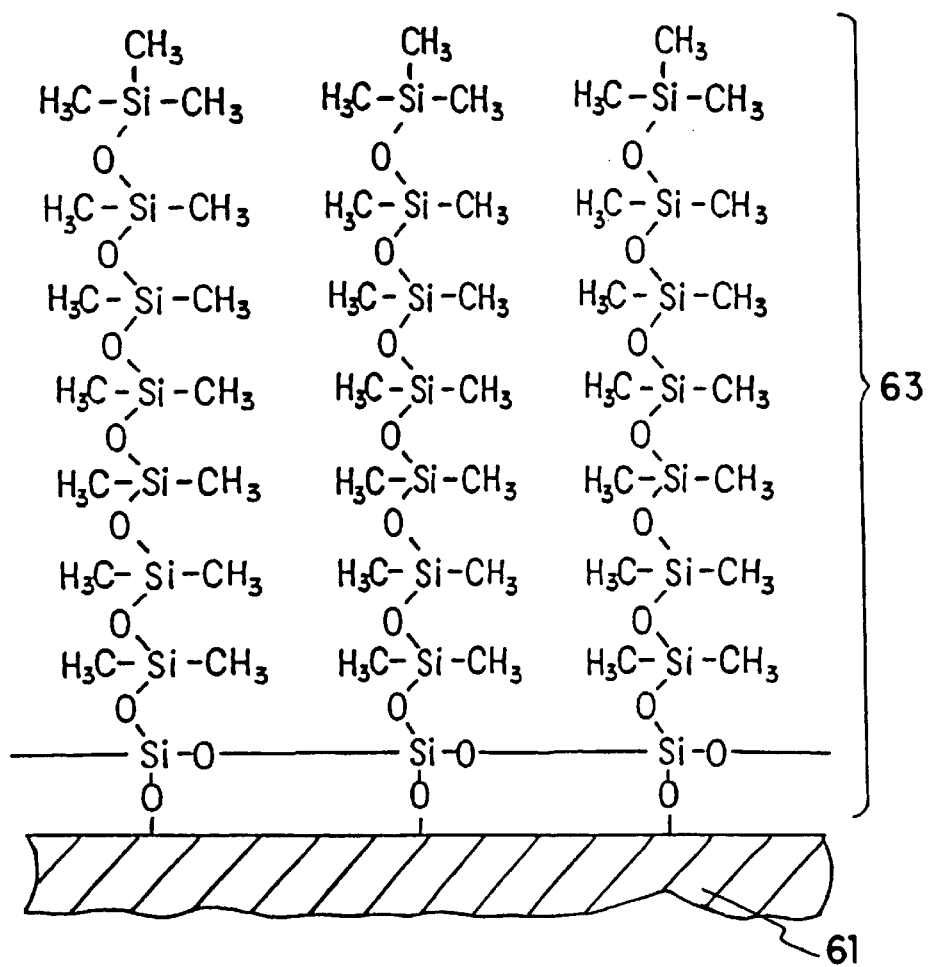

The substrate was then washed well with an organic solvent to remove non-reacted chemical adsorbed material remaining on the substrate surface, and then washed with water. Thus, a siloxane-based monomolecular layer 63 was formed such that it was chemically bonded to the surface, as shown in FIG. 6(b), represented by the formula [21];

[Formula 21]

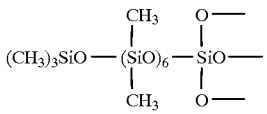

were thus produced over the entire substrate surface thus was formed such that it was chemically bonded to the substrate surface and had a thickness of about 2.5 nanometers (nm).

EXAMPLE 9

Figure 7A:
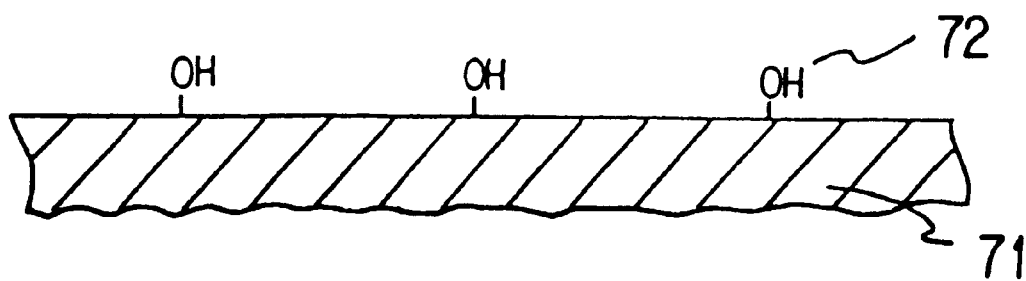
FIGS. 7(a)–(c) show a method of manufacturing a hydrophilic siloxane-based laminated chemically adsorbed film as in example 7 of the invention.

As shown in FIG. 7(a), a hydrophilic ceramic substrate 71 was prepared. If plastic or like water-repelling substrates are to be dealt with instead of metal, ceramic, glass and other substrates with the surface thereof oxidized, their surface may be oxidized to be hydrophilic by treating them with dichromic acid. Then, after thoroughly drying, the substrate was dipped and held in a solution of 80 wt. % of cyclohexane (or n-hexadecanetoluene or xylene or bicyclohexyl), 12 wt. % of carbon tetrachloride and 8 wt. % of chloroform, the solution containing a chemical adsorbed material with the molecule thereof having two chlorosilyl groups at molecule ends, for example

to a concentration of about 4 wt. %. Since the surface of the hydrophilic substrate contained many hydroxyl groups 72, a dehydrochlorination reaction was brought about between —SiCl groups at either end of the chemical adsorbed material and hydroxyl groups of the substrate surface. A monomolecular layer 73 represented by the formula [22];

[formula 20]

Figure 7B:
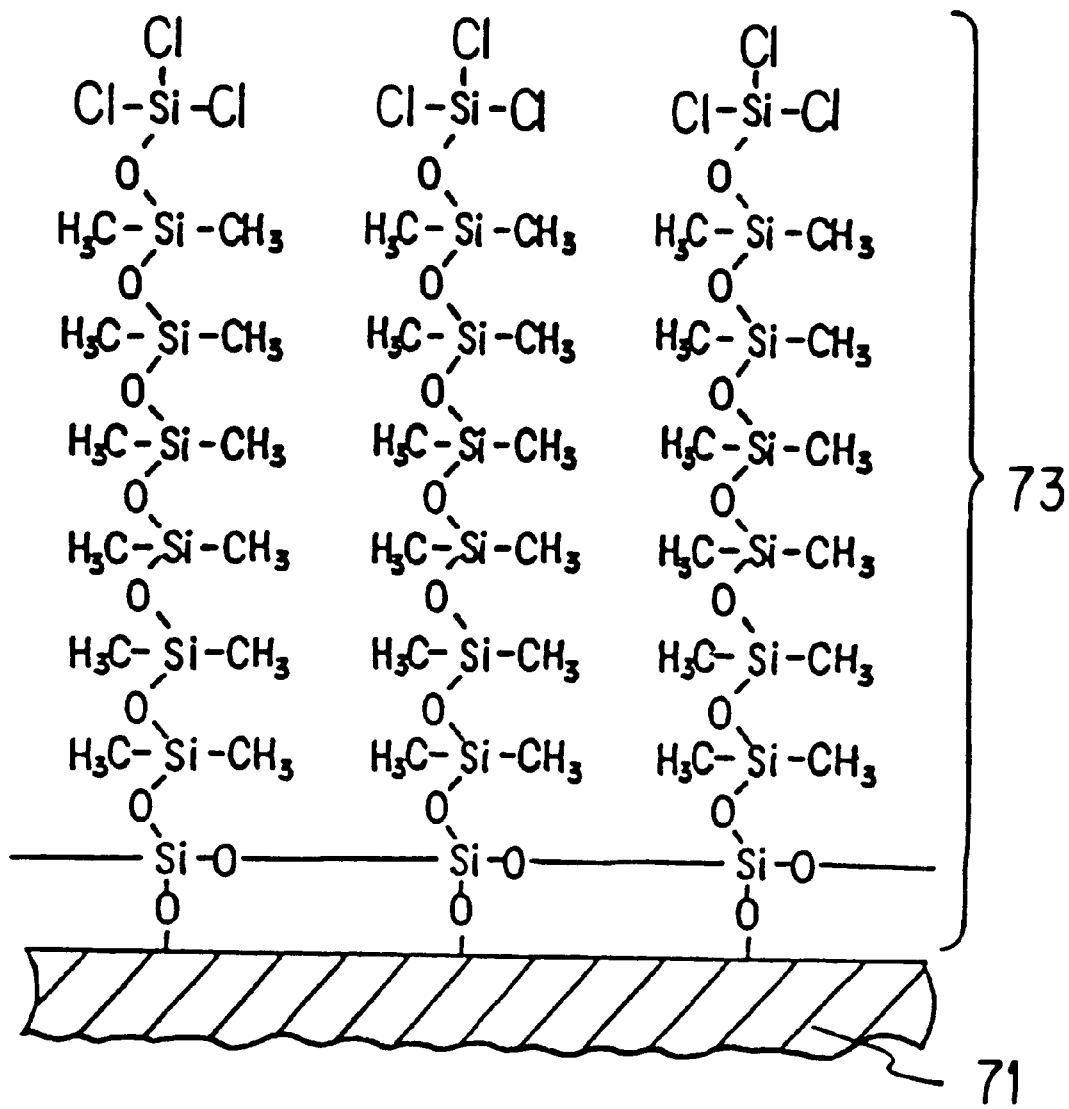
Figure 7C:
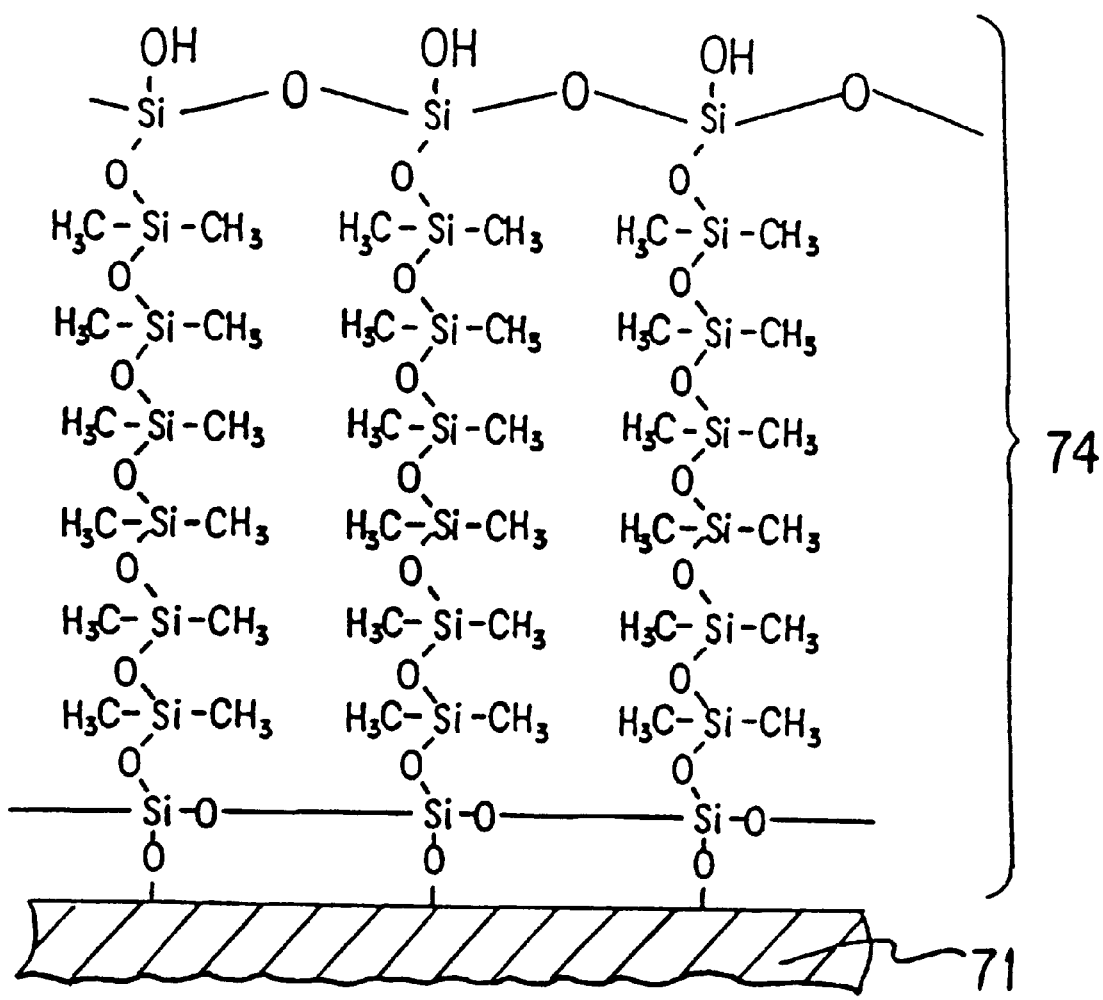

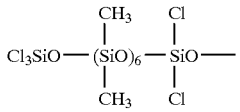

was thus formed over the entire substrate surface, as shown in FIG. 7(b).

The substrate was then washed well with an organic solvent (i.e., chloroform) to remove non-reacted chemical adsorbed material remaining on the substrate surface and then washed with water. Thus, a hydrophilic siloxane-based monomolecular layer 74 represented by the formula [23];

Formula [23]

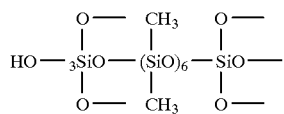

was formed such that it was chemically coupled to the surface and had a thickness of about 2.5 nm, as shown in FIG. 9(c).

EXAMPLE 10

Subsequent to Example 9, the substrate 81 was dried well and then dipped and held for about two hours in a solution containing 4 wt. % of $(CH_3)_3SiO—(Si(CH_3)_2O)_6—SiCl_3$, 80 wt. % cyclohexane (or n-hexadecanetoluene or xylene or bicyclohexyl), 12 wt. % of carbon tetrachloride and 7 wt. % of chloroform. Since the surface of the monomolecular film 82 contained many hydroxyl groups, a dehydrochlorination reaction was brought about between —SiCl groups at either end of molecules of the material having a plurality of chlorosilyl (—SiCl) groups at molecule ends and hydroxyl groups of the monomolecular film. A monomolecular layer 83 represented by the formula [24];

[Formula 24]

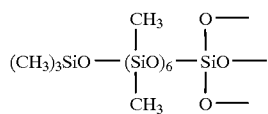

was thus formed in a laminated state on the monomolecular film obtained in Example 9.

Figure 8:
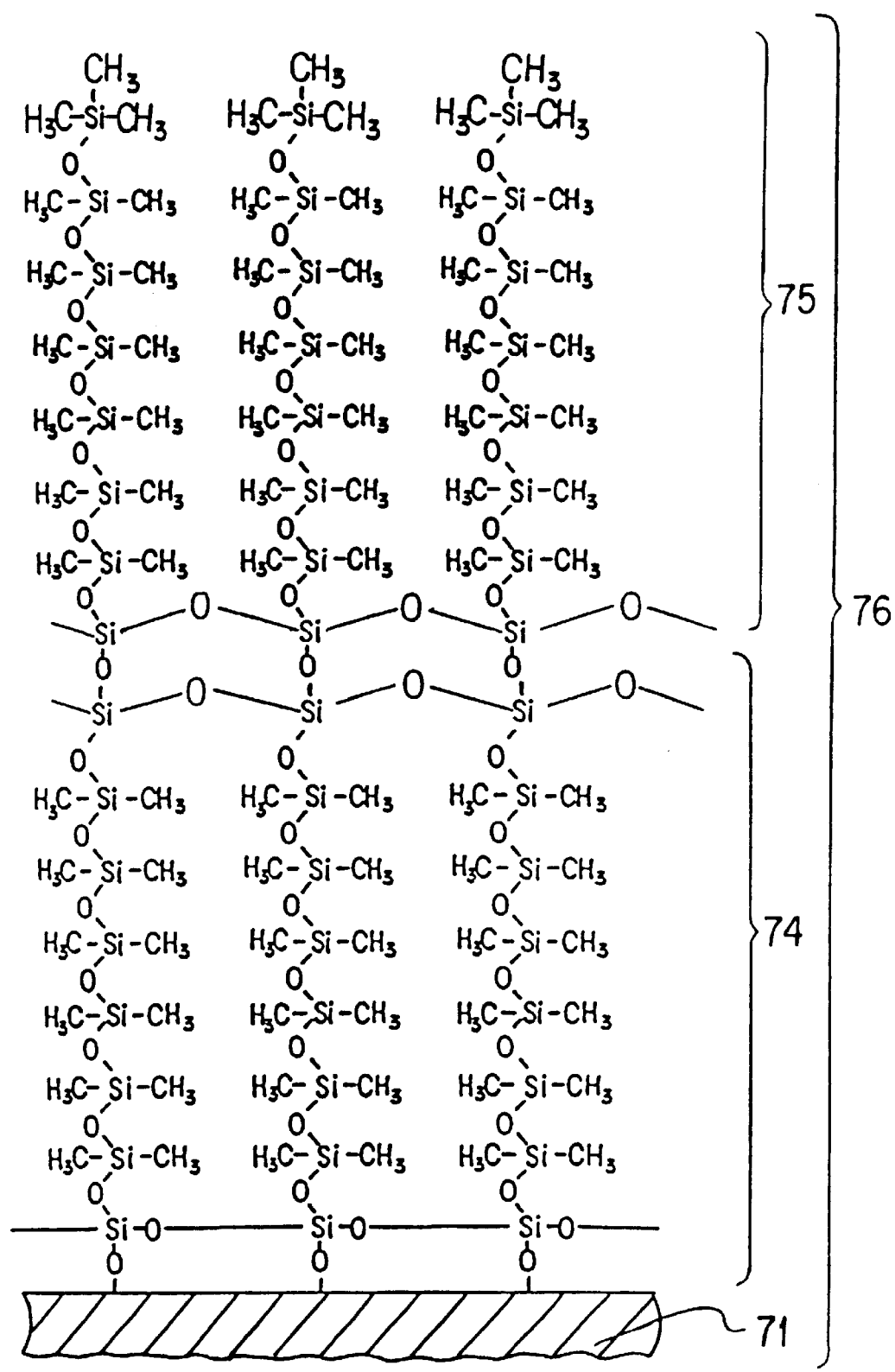
FIG. 8 shows a method of manufacturing a siloxane-based laminated chemically adsorbed film as in example 8 of the invention.

The substrate was then well washed with an organic solvent to remove excess surface active material remaining on the substrate surface and then washed with water. A siloxane-based monomolecular layer 85 was thus formed such that it was chemically bonded to the surface and had a thickness about 5.0 nm, as shown in FIG. 8.

When a multi-layer film is desired, the process of Example 8 to 10 may be repeated for a desired number of layers, and then Example 8 to 10 may be carried out. By so doing, a siloxane-based lamination monomolecular film having a water-repelling surface can be obtained. Further, by carrying out Example 8 to 10 for the last layer, a lamination monomolecular film having a hydrophilic surface can be obtained.

As has been shown, the invention is greatly beneficial to the industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A chemically adsorbed film comprising a monomolecular film having a siloxane based main chain fixed onto a substrate surface by covalent —Si— bonds, wherein the siloxane based main chain includes siloxane bonds oriented substantially vertically to said substrate surface.

2. The chemically adsorbed film according to claim 1, wherein the chemically adsorbed film layer is a single monomolecular film or monomolecular laminated film.

3. The chemically adsorbed film according to claim 1, comprising an outermost molecular layer of hydrophilic groups.

* * * * *